(12) United States Patent
Metzger et al.

(10) Patent No.: US 11,275,589 B2
(45) Date of Patent: Mar. 15, 2022

(54) METHOD FOR MANAGING THE SUPPLY OF INFORMATION, SUCH AS INSTRUCTIONS, TO A MICROPROCESSOR, AND A CORRESPONDING SYSTEM

(71) Applicants: STMicroelectronics (Rousset) SAS, Rousset (FR); STMicroelectronics (Grenoble 2) SAS, Grenoble (FR)

(72) Inventors: Sebastien Metzger, Aix en Provence (FR); Silvia Brini, Pisa (IT)

(73) Assignees: STMicroelectronics (Rousset) SAS, Rousset (FR); STMicroelectronics (Grenoble 2) SAS, Grenoble (FR)

( * ) Notice: Subject to any disclaimer, the term of this patent is extended or adjusted under 35 U.S.C. 154(b) by 0 days.

(21) Appl. No.: 16/573,299

(22) Filed: Sep. 17, 2019

(65) Prior Publication Data

US 2020/0097294 A1 Mar. 26, 2020

(30) Foreign Application Priority Data

Sep. 26, 2018 (FR) ...................... 1858771

(51) Int. Cl.
*G06F 9/38* (2018.01)
*G06F 9/48* (2006.01)
(Continued)

(52) U.S. Cl.
CPC .......... *G06F 9/3816* (2013.01); *G06F 9/4843* (2013.01); *G06F 12/084* (2013.01); *G06F 13/1668* (2013.01); *G06F 2212/1021* (2013.01)

(58) Field of Classification Search
CPC .................................................. G06F 9/3816
See application file for complete search history.

(56) References Cited

U.S. PATENT DOCUMENTS

| 4,811,215 A | * | 3/1989 | Smith | ................... G06F 9/3824 711/E12.046 |
| 5,826,109 A | * | 10/1998 | Abramson | ............ G06F 9/3824 710/39 |

(Continued)

FOREIGN PATENT DOCUMENTS

WO 0150269 A2 7/2001

OTHER PUBLICATIONS

Rao, Venkateswara, et al.: "A Frame work on AMBA bus based Communication Architecture to improve the Real Time Computing Performance in MPSoC," International Journal of Computer Applications (0975-8887), vol. 91—No. 5, Apr. 2014.

(Continued)

*Primary Examiner* — Michael J Metzger
(74) *Attorney, Agent, or Firm* — Crowe & Dunlevy

(57) ABSTRACT

A processor interacts with a memory set including a cache memory, a first memory storing at least a first piece of information in a first information group, and a second memory storing at least a second piece of information in a second information group. In response to a first cache miss and following a first request from the processor for the first piece of information, the first piece of information obtained from the first memory is supplied to the processor. After a second request from the processor for the second piece of information, the second piece of information obtained from the second memory is supplied to the processor, even if the first information group is currently being transferred from the first memory for loading into the cache memory.

16 Claims, 3 Drawing Sheets

(51) Int. Cl.
*G06F 12/084* (2016.01)
*G06F 13/16* (2006.01)

(56) References Cited

U.S. PATENT DOCUMENTS

| | | | | |
|---|---|---|---|---|
| 5,848,432 A | * | 12/1998 | Hotta | G06F 12/0846 |
| | | | | 711/131 |
| 2006/0075211 A1 | * | 4/2006 | Vorbach | G06F 12/084 |
| | | | | 712/221 |
| 2010/0211742 A1 | | 8/2010 | Turullols et al. | |
| 2011/0225369 A1 | | 9/2011 | Park et al. | |
| 2013/0138865 A1 | * | 5/2013 | Park | G06F 12/0238 |
| | | | | 711/102 |
| 2019/0318016 A1 | * | 10/2019 | Bassov | G06F 16/1744 |

OTHER PUBLICATIONS

INPI Search Report and Written Opinion for FR 1858771 dated May 21, 2019 (9 pages).

* cited by examiner

METHOD FOR MANAGING THE SUPPLY OF INFORMATION, SUCH AS INSTRUCTIONS, TO A MICROPROCESSOR, AND A CORRESPONDING SYSTEM

PRIORITY CLAIM

This application claims the priority benefit of French Application for Patent No. 1858771, filed on Sep. 26, 2018, the content of which is hereby incorporated by reference in its entirety to the maximum extent allowable by law.

TECHNICAL FIELD

Embodiments and applications of this disclosure relate to processors, and notably to the management of the supply of information, for example instructions, to these processors, particularly when a part of the software to be executed by the processor is located in an external memory and this part of the software is to be stored in a cache memory in order to optimize execution time.

BACKGROUND

There is a need to avoid adverse effects on the execution time of a group of instructions, for example an interrupt program, located in another memory, for example an internal flash memory, when a line of instructions containing a preceding instruction required by the processor and stored in the external memory is being loaded for storage in a cache memory.

SUMMARY

According to one aspect, a method is proposed for managing the supply of information to a processor. The term "information" is to be interpreted in a very broad sense, including instructions for example, but possibly also including information required for these instructions, such as notations (commonly referred to as "literals") representing fixed values in a source code.

The processor interacts with a set of memories including a cache memory, a first memory, for example an external memory, storing at least a first piece of information, for example an instruction, within a first information group, and a second memory, for example an internal memory such as a flash memory, storing at least a second piece of information, for example one or more instructions of an interrupt program, within a second information group.

An information group may include a plurality of bits, typically organized in a plurality of words, for example four words of 64 bits each.

Depending on the technology used for the memory storing this information group, the group may, for example, occupy a portion of a line, a full line, or a plurality of lines in this memory.

A method aspect described herein includes, after a first cache miss, following a first request from the processor for the first piece of information, performing a first supply to the processor of the first piece of information obtained from the first memory. Then, after a second request from the processor for the second piece of information, the method includes performing a second supply to the processor of the second piece of information obtained from the second memory, even if the first information group is in the course of being transferred from the first memory for its loading into the cache memory.

Thus, even if this transfer of this first information group takes several hundreds of cycles of the clock signal timing the processor, the interrupt program may be executed in real time.

The loading into a cache memory is typically carried out into a location of this cache memory commonly known in the art as a "cache line". This cache line includes a set of memory locations intended to store a group of bits, and represents the indivisible element to be accessed in order to determine whether or not there is a cache miss, or in order to store therein a new group of bits obtained from another memory following a cache miss.

Depending on the technology used and the size of the cache line, a cache memory may include a single random access memory or a plurality of random access memories accessible in parallel, and the cache line may be located in a portion of a line, in one line, or in a plurality of lines of the single random access memory or in a plurality of lines in a plurality of random access memories.

The second information group in which the second piece of information is located may or may not be intended to be stored in the cache memory; in other words, it may be "cacheable" or "non-cacheable".

If the second piece of information is intended to be stored in the cache memory (that is to say, if it is cacheable), then the method includes a second cache miss following the second request. In other words, the supply of the second piece of information obtained from the second memory follows a cache miss.

According to one embodiment, a cache controller, coupled between the processor and the memory set, may be provided, and the first supply of the first piece of information and the second supply of the second piece of information may then be carried out, respectively, on two separate buses which connect the first memory and the second memory, respectively, to the cache controller, and on a third bus connecting the cache controller and the processor.

According to one embodiment, if the second information group is ready to be loaded into a cache line of the cache memory before the first information group is ready to be loaded into the same cache line (when the processor has initially requested the first piece of information and then requested the second piece of information), the loading of the first information group into the cache line is prevented.

In other words, if the first information group and the second information group are intended to be stored in the same cache line, the loading of the first information group into this cache line is prevented if the second information group, which was the subject of a subsequent request, is ready to be stored in the cache line before the first information group is ready to be stored there.

This is because, if there is a deterministic replacement policy which specifies, for example, that the information from the second memory takes priority, it is desirable to respect this priority in order to avoid disrupting the determinism of the method.

This embodiment helps ensure that priority information in the cache line is not overwritten by information of lower priority.

As mentioned above, the first piece of information may include at least one instruction to be executed by the processor.

On the other hand, the second piece of information may include at least one instruction of an interrupt program.

According to another aspect, a system is proposed, including a processor, and a memory set configured to interact with the processor. The memory set includes at least a cache memory, a first memory configured to store at least a first piece of information in a first information group, and a second memory configured to store at least a second piece of information in a second information group. The system also includes control circuitry configured for after a first request from the processor for the first piece of information, making a first supply to the processor of the first piece of information obtained from the first memory. Then, after a second request from the processor for the second piece of information, the control circuitry is configured for making a second supply to the processor of the second piece of information obtained from the second memory, even if the first information group is in the course of being transferred from the first memory for its loading into the cache memory, such as into a cache line of this cache memory.

According to one embodiment, if the second piece of information is cacheable, the control circuitry is configured to perform the second supply after a second cache miss following the second request.

In one embodiment, the control circuitry includes a cache controller coupled between the processor and the memory set, the cache controller having at least a first interface, a second interface and a third interface. The control circuitry also includes a first bus coupled between the first interface and the first memory, a second bus coupled between the second interface and the second memory, and a third bus coupled between the third interface and the processor.

The cache controller is advantageously configured for supplying the first piece of information, delivered by the first memory on the first bus, to the processor via the third interface and the third bus, and for supplying the second piece of information, delivered by the second memory on the second bus, to the processor via the third interface and the third bus.

According to one embodiment, the control circuitry is configured for, if the second information group is ready to be loaded into a cache line of the cache memory before the first information group is ready to be loaded into the same cache line, preventing the loading of the first group.

More precisely, in this case, according to one embodiment, the first interface includes a buffer memory configured for storing the first information group obtained from the first memory, and the cache controller is configured for causing the process of storing the first information group to be aborted.

As mentioned above, the first piece of information may include at least one instruction to be executed by the processor, while the second piece of information may include at least one instruction of an interrupt program.

The system may include a microcontroller incorporating the processor, the cache memory, the second memory and the cache controller, with the first memory being a memory external to the microcontroller.

BRIEF DESCRIPTION OF THE DRAWINGS

Other advantages and characteristics will be apparent from a perusal of the detailed description of embodiments and applications which are not limiting in any way, and the appended drawings, in which.

DETAILED DESCRIPTION

Figure 1:
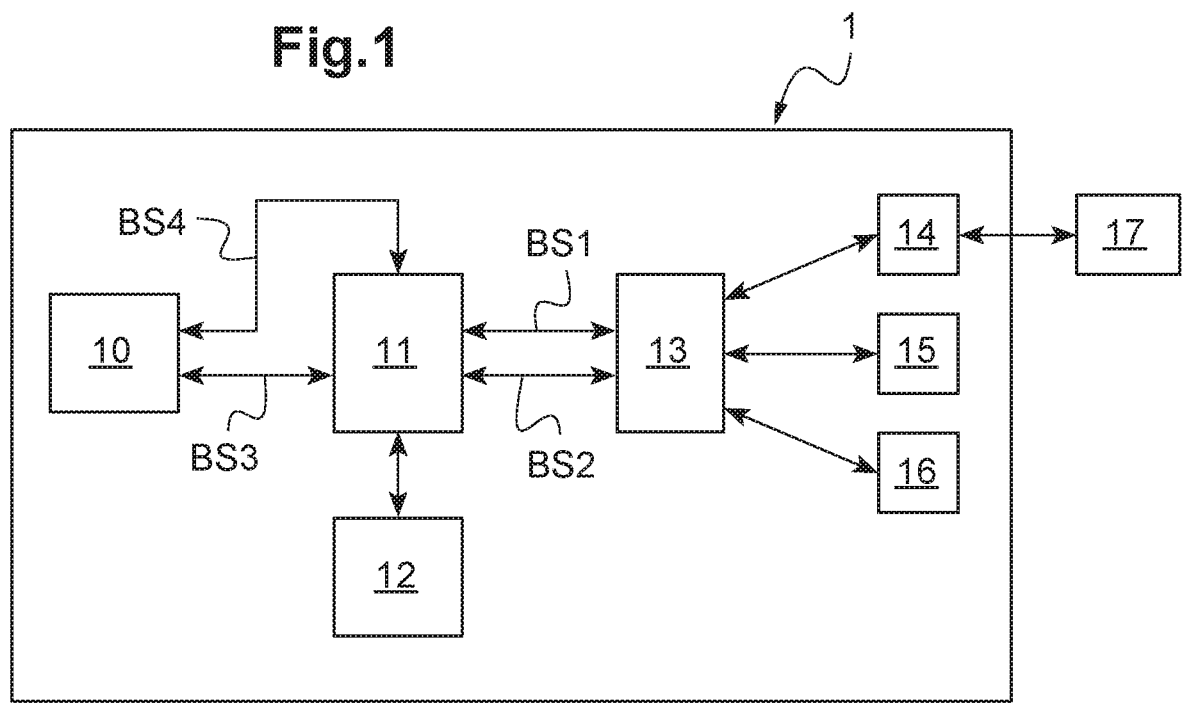
FIG. 1 is a block diagram of a system in accordance with this disclosure.

In FIG. 1, the reference 1 denotes a system, particularly a microcontroller, for example that marketed by STMicroelectronics under the reference STM32.

This microcontroller includes a central calculation unit or processor 10, together with a memory set which in this case includes a memory 17 external to the microcontroller, an internal memory 16, a flash memory for example, and another internal memory 15 (for example a random access memory (RAM)).

The external memory 17 is coupled to a memory controller 14 having a conventional structure.

The microcontroller 1 also includes a cache memory 12, for example a 2-way associative memory, coupled to a cache controller 11.

The cache controller 11 is coupled to the memory controller 14, to the memory 15, and to the memory 16 via an interconnection circuit 13 including input ports and output ports.

The structure of such an interconnection circuit may involve a multi-layer interconnection circuit, and the protocol for the exchange and routing of transactions in the interconnection circuit. An example multi-layer interconnection circuit that may be used is described in detail in the article by Venkateswara Rao et al., entitled "A Frame work on AMBA bus based Communication Architecture to improve the Real Time Computing Performance in MPSoC", International Journal of Computer Applications (0975-8887), Volume 91—No. 5, April 2014, the contents of which are incorporated by reference in their entirety. Additionally, by way of guidance but without limiting intent, it is possible to use, for example, the interconnection circuit marketed by the ARM Company under the reference NIC-400 (version R0p3).

The interconnection circuit 13 is connected to the cache controller 11 by two buses BS1 and BS2.

The cache controller is also connected to the microprocessor by a third bus BS3 and by a fourth bus BS4, which, as detailed below, permits the configuration of the registers of the cache controller.

The different buses may have any suitable structure, being, for example, AHB buses using a protocol described, for example, in the document AMBA 3 AHB-Lite Protocol V1.0 Specification, issued by the ARM company (2001, 2006), the contents of which are incorporated by reference in their entirety.

The cache controller 11 (coupled between the processor 10 and the memory set 15, 16 and 17, the first bus BS1, the second bus BS2, and the third bus BS3) here forms control circuitry configured for after a first request from the processor 10 for a first piece of information, for example a first instruction, making a first supply to the processor 10 of the first instruction obtained from the first memory 17, and then, after a second request from the processor 10 for a second piece of information, making a second supply to the processor 10 of the second piece of information obtained from the second memory 16, even if the group of instructions in which the first instruction appears is in the course of being transferred from the first memory 17 for its loading into a cache line of the cache memory 12.

An example of the embodiment of such a method is described in detail below.

Figure 2:
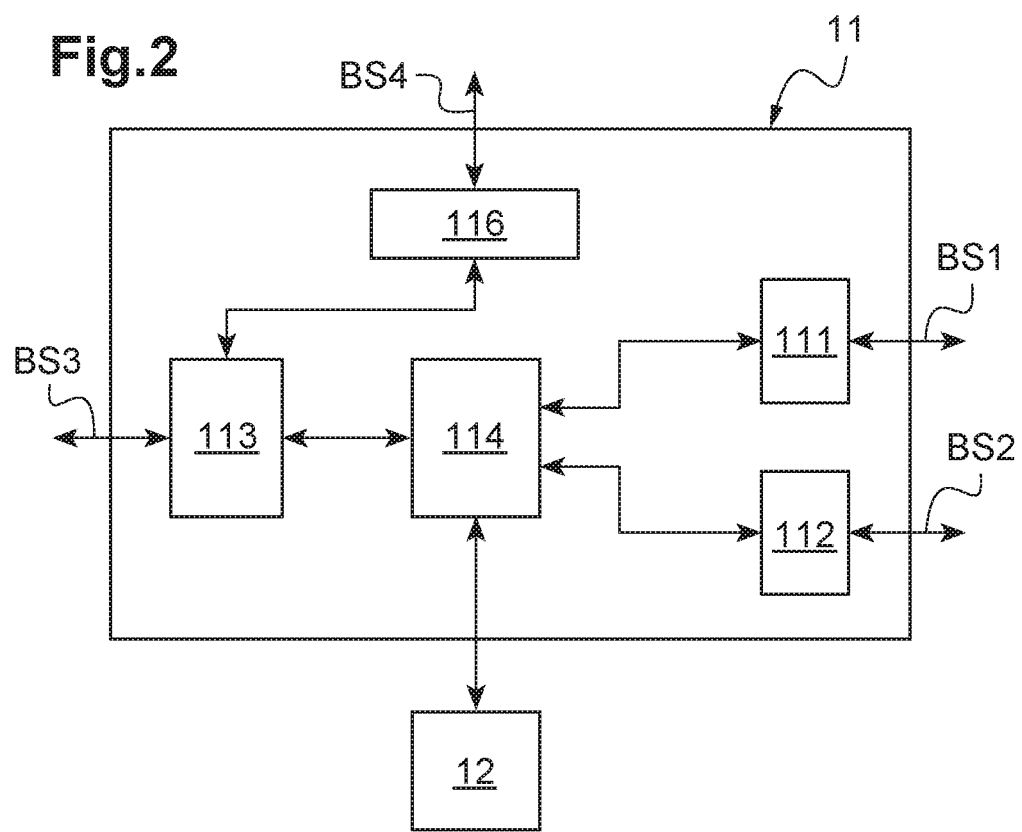
FIG. 2 is a block diagram of the cache controller of FIG. 1.

Referring more particularly to FIG. 2, it may be seen that the cache controller 11 includes, in this example embodiment, a first interface 111 coupled to the first bus BS1, a second interface 112 coupled to the second bus BS2, and a third interface 113 coupled to the third bus BS3.

The cache controller also includes a register interface 116 coupled to the bus BS4.

The third interface 113 includes a state machine intended to manage the dialog with the bus connected to the processor 10.

This interface 113 receives the requests from the processor, including the addresses of the required information (instructions) in memory, and supplies the instructions to the processor when they are available.

The first interface 111 is configured for receiving the requests for instructions issued from the processor 10 to the external memory 17 and for supplying the corresponding instructions to the processor 10.

Additionally, if an instruction forms part of a group of instructions in the first memory, the first interface 111 includes a buffer memory configured for storing this group of instructions obtained from the memory 17 and then, when the storage is completed, sending a notification to a cache control circuit 114, which controls writing to and reading from the cache memory 12.

The second interface 112 has a structure equivalent to that of the first interface 111, and is configured, in this case, for receiving the requests for instructions issued from the processor 10 to the external memory 16 and for returning the instructions to the processor 10.

The two interfaces 111 and 112 also include state machines.

As mentioned above, the interface 116 enables the registers of the cache controller to be configured in response to a configuration instruction issued from the processor, and makes it possible to specify, on the basis of the address associated with a request from the processor, the memory in which the corresponding information or instruction is stored.

Figure 3:
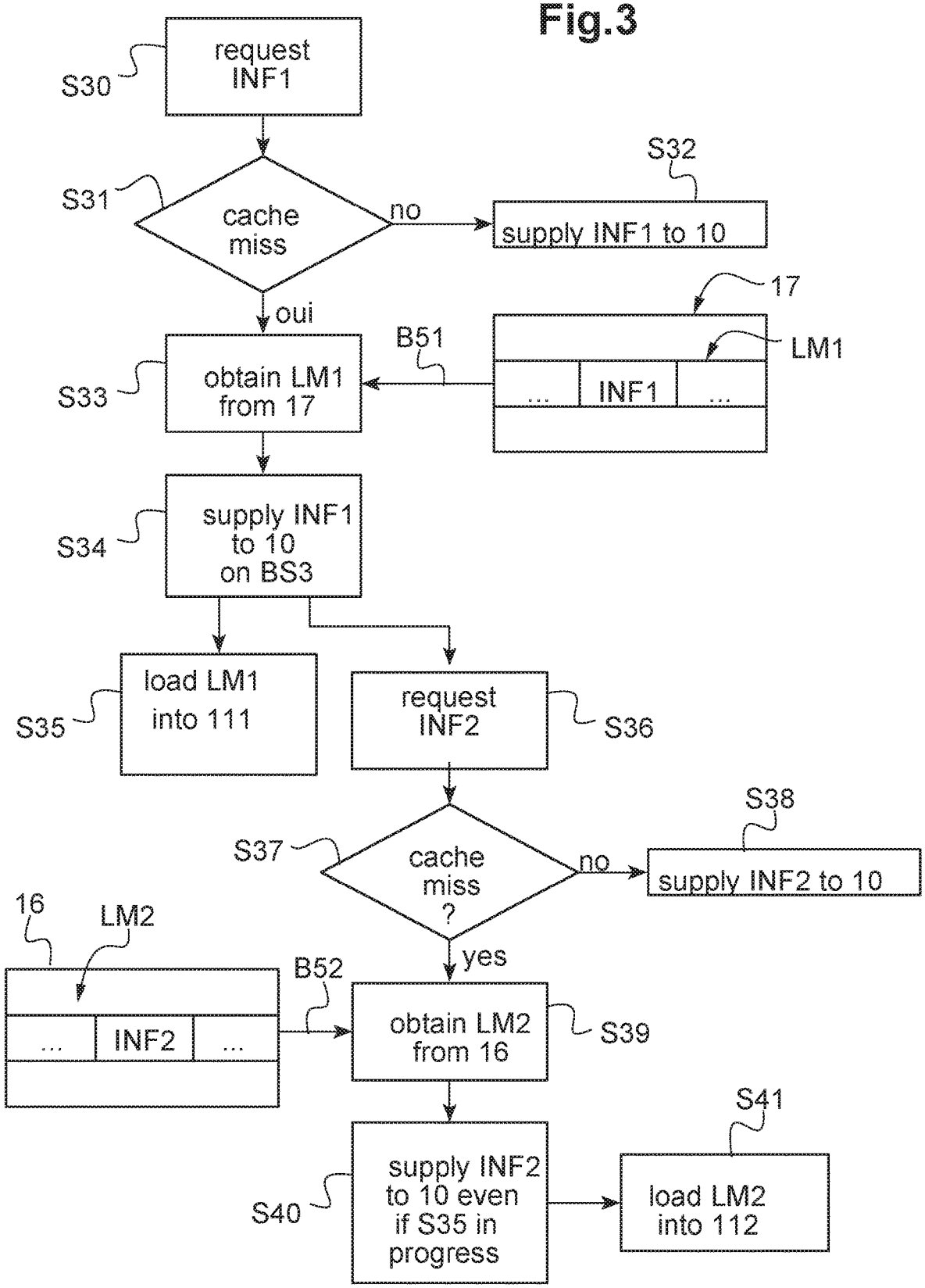
FIG. 3 is a flowchart of a method of operating the system of FIG. 1.
Figure 4:
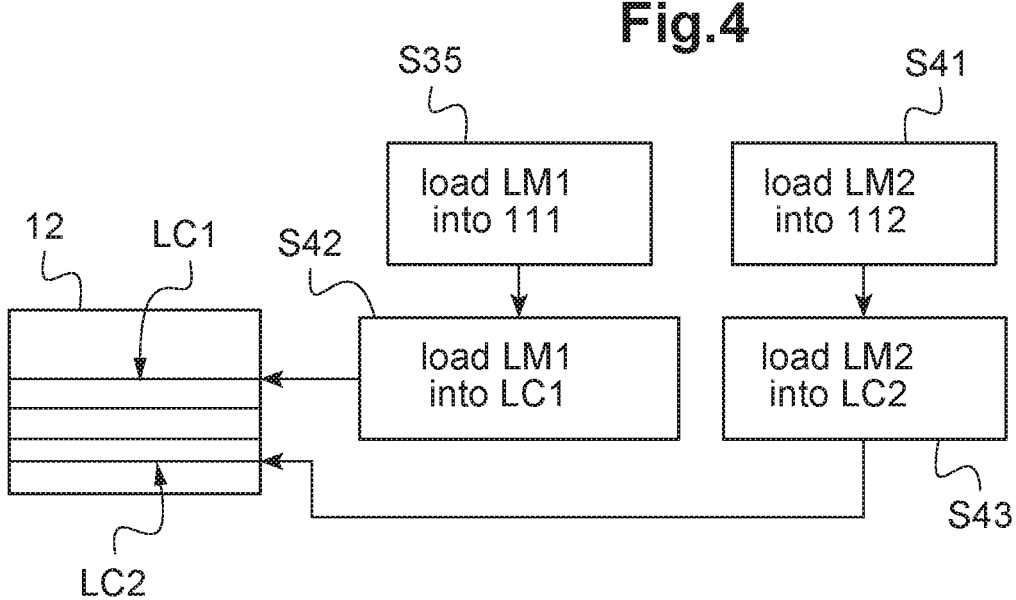
FIG. 4 is a flowchart that is a continuation of the flowchart of FIG. 3.
Figure 5:
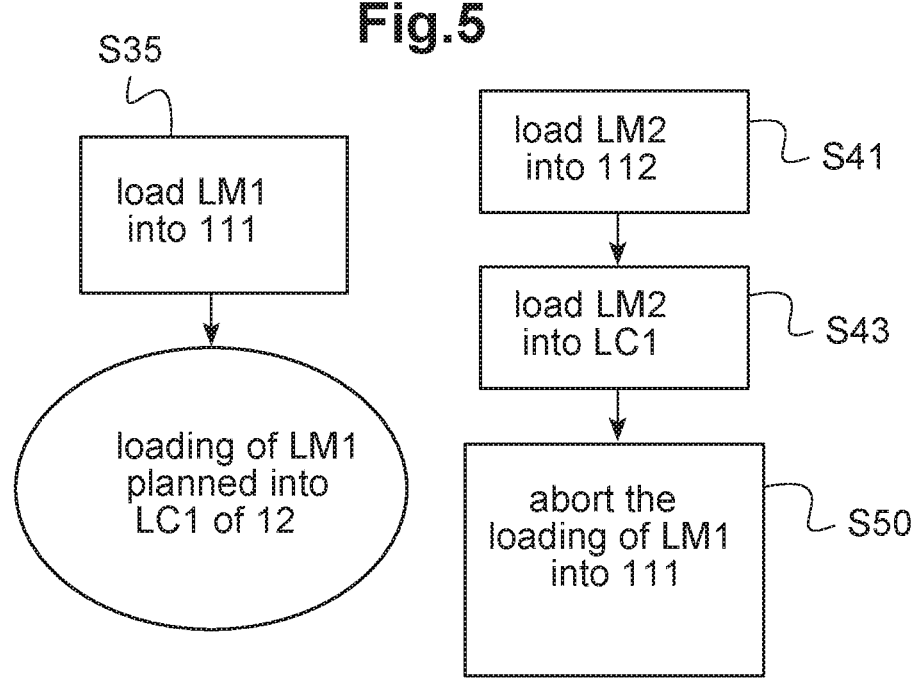
FIG. 5 is a flowchart that is a continuation of the flowchart of FIG. 3 and shows alternative method steps to the flowchart of FIG. 4.

Reference will now be made more particularly to FIGS. 3 to 5, in order to describe an example of embodiment of the method of this disclosure.

In FIG. 3, it is assumed in step S30 that the processor 10 is sending a request on the bus BS3 for an instruction INF1, which is present within a group of instructions LM1 which, in this example, is assumed to occupy a line of the external memory 17.

The cache controller initially checks in step S31 whether this instruction INF1 is already stored in a cache line of the cache memory 12.

If there is no cache miss, that is to say if this instruction INF1 is already stored in a cache line of the cache memory, then the cache controller supplies the instruction INF1 to the processor 10 (step S32).

If there is a cache miss, that is to say if the instruction INF1 is not stored in a cache line of the cache memory, then the cache controller sends a request to the first interface 111 so that the group of instructions LM1 occupying the line of the memory 17 and containing the instruction INF1 is transmitted on the bus BS1 to this first interface 111, the instruction INF1 being transmitted first (step S33).

Then, in step S34, the cache controller supplies the instruction INF1 to the processor 10 on the bus BS3.

In parallel, the whole group of instructions LM1 is loaded into a buffer memory of the first interface 111 (step S35).

It is also assumed that, after the request for the instruction INF1, the processor sends, in step S36, a second request for a second instruction INF2, which this time is stored within a second group of instructions LM2 which, in this example, is assumed to occupy a line LM2 in the internal memory 16.

In this example, it is assumed that this part of the memory containing the group LM2 is cacheable, that is to say also intended to be stored in the cache memory.

The cache controller therefore checks, in step S37, whether a cache miss is present.

If there is no cache miss, that is to say if the instruction INF2 is already present in the cache memory, the cache controller supplies the instruction INF2 to the processor 10 (step S38).

Conversely, if there is a cache miss, the second interface 112 will read the internal memory 16 so as to obtain on the bus BS2 the group of instructions LM2 containing the instruction INF2 (step S39).

Here again, the instruction INF2 is supplied first to the interface 112.

The cache controller supplies this instruction INF2 in step S40 to the processor 10, even if the loading of the information group LM1 is still in progress in the buffer memory of the first interface 111 (step S35).

Therefore, if this instruction INF2 launches an interrupt program, the latter may be executed immediately without waiting for the end of the loading of the information group LM1 into the buffer memory of the interface 111.

The whole information group LM2 is then loaded into the buffer memory of the interface 112 (step S41), for the purpose of subsequent storage in a cache line of the cache memory.

This is shown in greater detail in FIG. 4. More precisely, when the loading of the information group LM1 into the buffer memory of the first interface 111 (step S35) is complete, the interface sends a notification to the cache control circuit 114.

The latter circuit will then load this information group LM1, in step S42, into a cache line LC1 of the cache memory 12.

The same process is executed in relation to the information group LM2. When this group is loaded (step S41) into the buffer memory of the first interface 112, this first interface 112 sends a notification to the cache control circuit, which then loads the group of instructions LM2 into a cache line LC2 of the cache memory 12 (step S43).

When the cache lines LC1 and LC2 are different, there is no problem. In certain cases, however, the cache line LC1 may be identical to the cache line LC2. In other words, the group of instructions LM1 and the group of instructions LM2 are intended to be stored in the same cache line, for example the cache line LC1. This is shown in FIG. 5.

Thus, following the first request for the instruction INF1, the group of instructions LM1 is loaded into the buffer memory of the first interface 111 (step S35) as mentioned above. This group of instructions LM1 is intended to be loaded subsequently into the cache line LC1 of the cache memory 12.

In parallel, the group of instructions LM2, containing the second instruction INF2 required by the processor, is being loaded into the buffer memory of the second interface 112 (step S41). If the loading S41 is terminated while the loading S35 is in progress, the cache control circuit 114 will then load the group of instructions LM2 into the cache line LC1 (step S43). In order to ensure that this group of instructions LM2 is not overwritten by the group of instructions LM1, the cache controller sends an instruction for the abortion of the current loading of the group of instructions LM1 into the buffer memory of the interface 111 (step S50).

The techniques herein therefore make it possible to manage in parallel the access to different memories containing, for example, instructions to be executed by the processor, and to avoid adverse effects on the execution of an interrupt program stored in a memory, for example an internal memory, while a series of instructions obtained from another memory, for example an external memory, is being loaded into a buffer memory for the purpose of loading into a cache line of the cache memory. This is applicable whether or not the interrupt program is cacheable.

Additionally, if two series of instructions, which are respectively stored, for example, in two memory lines of the two memories, are cacheable and intended to be stored in the same cache line, the described policy of replacement in the cache memory is advantageous. In fact, if a second series of instructions resulting from a second request, subsequent to the first request, is ready to be loaded into the cache line before the first series of instructions resulting from the previous request, an abortion of the process is provided, leading to the loading of the first series of instructions into the cache line.

The invention claimed is:

1. A method of managing supply of information to a processor, the processor interacting with a memory set including a cache memory, a first memory storing at least a first piece of information in a first information group, and a second memory storing at least a second piece of information in a second information group, the method comprising:
   after a first cache miss and following a first request from the processor for the first piece of information, performing a first supply to the processor of the first piece of information obtained from the first memory;
   after a second request from the processor for the second piece of information, performing a second supply to the processor of the second piece of information obtained from the second memory while the first information group is currently being transferred from the first memory for its loading into the cache memory, the second piece of information being different than the first piece of information; and
   if the second piece of information is ready to be loaded into a cache line of the cache memory before the first piece of information is ready to be loaded into that cache line, preventing the loading of the first piece of information into that cache line.

2. The method according to claim 1, further comprising allowing a second cache miss subsequent to the second request.

3. The method according to claim 2, wherein a cache controller is coupled between the processor and the memory set, and the first supply of the first piece of information and the second supply of the second piece of information are, respectively, carried out on two separate buses which connect the first memory and the second memory, respectively to the cache controller, and on a third bus connecting the cache controller and the processor.

4. The method according to claim 1, wherein the first piece of information includes at least one instruction to be executed by the processor.

5. The method according to claim 1, wherein the second piece of information includes at least one instruction of an interrupt program.

6. The method of claim 1, wherein the second request from the processor from the processor for the second piece of information occurs subsequent to the first request from the processor for the first piece of information.

7. The method of claim 1, wherein if the second piece of information is ready to be loaded into a cache line of the cache memory before the first piece of information is ready to be loaded into that cache line and the second piece of information is considered to take priority over the first piece of information, the loading of the first piece of information into that cache line is prevented.

8. A system, comprising:
   a processor;
   a memory set configured to interact with the processor and including a cache memory, a first memory configured to store at least a first piece of information in a first information group, and a second memory configured to store at least a second piece of information in a second information group, the second piece of information being different than the first piece of information; and
   control circuitry configured to:
      after a first request from the processor for the first piece of information, perform a first supply to the processor of the first piece of information obtained from the first memory;
      after a second request from the processor for the second piece of information, perform a second supply to the processor of the second piece of information obtained from the second memory while the first information group is currently being transferred from the first memory for its loading into the cache memory; and
      if the second piece of information is ready to be loaded into a cache line of the cache memory before the first piece of information is ready to be loaded into that cache line, preventing the loading of the first piece of information into that cache line.

9. The system according to claim 8, wherein the control circuitry is to make the second supply after a cache miss following the second request.

10. The system according to claim 9, wherein the control circuitry includes:
    a cache controller coupled between the processor and the memory set, and having a first interface, a second interface, and a third interface;
    a first bus coupled between the first interface and the first memory;
    a second bus coupled between the second interface and the second memory; and
    a third bus coupled between the third interface and the processor;
    wherein the cache controller is configured to:
       supply the first piece of information, delivered by the first memory on the first bus, to the processor via the third interface and the third bus; and
       supply the second piece of information, delivered by the second memory on the second bus, to the processor via the third interface and the third bus.

11. The system according to claim 10, wherein the first interface includes a buffer memory configured to store the first information group obtained from the first memory; and wherein the cache controller is configured to cause the storing of the first information group to be aborted.

12. The system according to claim 8, wherein the first piece of information includes at least one instruction to be executed by the processor.

13. The system according to claim 8, wherein the second piece of information includes at least one instruction of an interrupt program.

14. The system according to claim 10, further comprising a microcontroller incorporating the processor, the cache memory, the second memory and the cache controller; and wherein the first memory is external to the microcontroller.

15. The system of claim 8, wherein the second request from the processor from the processor for the second piece of information occurs subsequent to the first request from the processor for the first piece of information.

16. The system of claim 8, wherein if the second piece of information is ready to be loaded into a cache line of the cache memory before the first piece of information is ready to be loaded into that cache line and the second piece of information is considered to take priority over the first piece of information, the control circuitry is configured to prevent the loading of the first piece of information into that cache line.

\* \* \* \* \*